(12) United States Patent
Lee et al.

(10) Patent No.: US 9,245,173 B2
(45) Date of Patent: Jan. 26, 2016

(54) APPARATUS AND METHOD FOR IDENTIFYING FAKE FACE

(71) Applicant: SUPREMA INC., Seongnam-si (KR)

(72) Inventors: Ki Deok Lee, Suwon-si (KR); Bo Gun Park, Suwon-si (KR); Ho Chul Shin, Yongin-si (KR); Bong Seop Song, Seoul (KR); Jae Won Lee, Seongnam-si (KR)

(73) Assignee: SUPREMA INC., Seongnam-Si (KR)

( * ) Notice: Subject to any disclaimer, the term of this patent is extended or adjusted under 35 U.S.C. 154(b) by 64 days.

(21) Appl. No.: 13/772,519

(22) Filed: Feb. 21, 2013

(65) Prior Publication Data

US 2013/0223681 A1    Aug. 29, 2013

(30) Foreign Application Priority Data

Feb. 29, 2012    (KR) ........................ 10-2012-0021305

(51) Int. Cl.
*G06K 9/00*    (2006.01)
(52) U.S. Cl.
CPC ........ *G06K 9/00281* (2013.01); *G06K 9/00597* (2013.01); *G06K 9/00899* (2013.01)
(58) Field of Classification Search
None
See application file for complete search history.

(56) References Cited

U.S. PATENT DOCUMENTS

2008/0025580 A1*    1/2008    Sidlauskas et al. ........... 382/124
2009/0016574 A1*    1/2009    Tsukahara .................... 382/117
2010/0290668 A1*    11/2010    Friedman et al. ............. 382/103

FOREIGN PATENT DOCUMENTS

| CN | 101119679 | 2/2008 |
| CN | 101536384 | 9/2009 |
| KR | 10-2007-0004213 | 1/2007 |
| WO | 2008/108871 | 9/2008 |

OTHER PUBLICATIONS

Sung Joo Lee; Kang Ryoung Park; Jaihie Kim, "Robust Fake Iris Detection Based on Variation of the Reflectance Ratio Between the Iris and the Sclera," Biometric Consortium Conference, 2006 Biometrics Symposium: Special Session on Research at the , vol., No., pp. 1,6, Sep. 19, 2006-Aug. 21, 2006.*

* cited by examiner

*Primary Examiner* — Atiba O Fitzpatrick
(74) *Attorney, Agent, or Firm* — Lex IP Meister, PLLC

(57)    ABSTRACT

An apparatus for identifying a fake face is provided. A first eye image acquirer acquires a first eye image by taking a picture of a subject while radiating a first ray having a first wavelength. A second eye image acquirer acquires a second eye image by taking a picture of the subject while radiating a second ray having a second wavelength that is shorter than the first wavelength. A controller extracts a first area and a second area having brighter lightness than the first area from each of the first and second eye images, calculates a lightness of the first area and a lightness of the second area in the first eye image, and a lightness of the first area and a lightness of the second area in the second eye image, and determines whether the subject uses a fake face based on the calculated lightness.

9 Claims, 6 Drawing Sheets

APPARATUS AND METHOD FOR IDENTIFYING FAKE FACE

CROSS-REFERENCE TO RELATED APPLICATION

This application claims priority to and the benefit of Korean Patent Application No. 10-2012-0021305 filed in the Korean Intellectual Property Office on Feb. 29, 2012, the entire contents of which are incorporated herein by reference.

BACKGROUND (a) Field

The below-described technology relates to an apparatus and a method for identifying a fake face.

(b) Description of the Related Art

In various systems such as an access control system, a work hour management system, a building automation system, a banking ATM, a computer security system, an electronic commerce authentication system, and an airport automation system, biometrics technologies follows fingerprint recognition technologies. A technology for identifying a face of a user and authenticating the user is proposed as one of the biometrics technologies. A conventional face identification technology cannot identify a fake face when the third party forges a face using the fake face such as an artificial eye, an eye image, an image displayed on a display device, or a fake eye of a face.

SUMMARY

An embodiment of the present invention provides a fake face identification apparatus and method using characteristic of an eye image to identify a fake face and improve authentication performance.

According to another embodiment of the present invention, an apparatus for identifying a fake face is provided. The apparatus includes a first eye image acquirer, a second eye image acquirer, and a controller. The first eye image acquirer acquires a first eye image by taking a picture of a subject while radiating a first ray having a first wavelength, and the second eye image acquirer acquires a second eye image by taking a picture of the subject while radiating a second ray having a second wavelength that is shorter than the first wavelength. The controller extracts a first area and a second area having brighter lightness than the first area from each of the first eye image and the second eye image, calculates a first lightness of the first area and a second lightness of the second area in the first eye image, and a third lightness of the first area and a fourth lightness of the second area in the second eye image, and determines whether the subject uses a fake face based on the first lightness, the second lightness, the third lightness, and the fourth lightness.

The first ray may include an infrared ray, and the second ray may include a visible ray.

The first area may include an iris area, and the second area may include a sclera area.

The controller may be further configured to determine that the subject uses the fake face when a difference between the first lightness and the second lightness is equal or greater than a difference between the third lightness and the fourth lightness, and to determine that the subject uses a real face when the difference between the first lightness and the second lightness is less than the difference between the third lightness and the fourth lightness.

The controller may be further configured to determine that the subject uses the fake face when the first lightness is equal to or lower than the third lightness and/or the second lightness is equal to or higher than the fourth lightness, and determine that the subject uses a real face when the first lightness is higher than the third lightness and/or the second lightness is lower than the fourth lightness.

The controller may be further configured to convert a difference between the first lightness and the second lightness to a first spatial frequency and a difference between the third lightness and the fourth lightness to a second spatial frequency, and to determine whether the subject uses the fake face by using the first spatial frequency and the second spatial frequency.

In this case, the controller may be further configured to determine the subject uses the fake face when amplitude of a high frequency component for the first spatial frequency is equal to or greater than amplitude of a high frequency component for the second spatial frequency, and to determine the subject uses a real face when the amplitude of the high frequency component for the first spatial frequency is less than the amplitude of the high frequency component for the second spatial frequency.

The fake face may include any one of an artificial eye, an eye image on a photo, an eye image on a printed page, an eye of a mannequin, or an eye image played by a video.

The apparatus may further include a storage configured to store the first lightness, the second lightness, the third lightness, the fourth lightness, and a determining result of the controller.

According to yet another embodiment, a method of identifying a fake face is provided by a fake face identification apparatus. The method includes acquiring a first eye image by taking a picture of a subject while radiating a first ray having a first wavelength, acquiring a second eye image by taking a picture of the subject while radiating a second ray having a second wavelength that is shorter than the first wavelength, extracting a first area and a second area having brighter lightness than the first area from each of the first eye image and the second eye image, calculating a first lightness of the first area and a second lightness of the second area in the first eye image, and a third lightness of the first area and a fourth lightness of the second area in the second eye image, and determining whether the subject uses a fake face based on the first lightness, the second lightness, the third lightness, and the fourth lightness.

DETAILED DESCRIPTION

Figure 1:
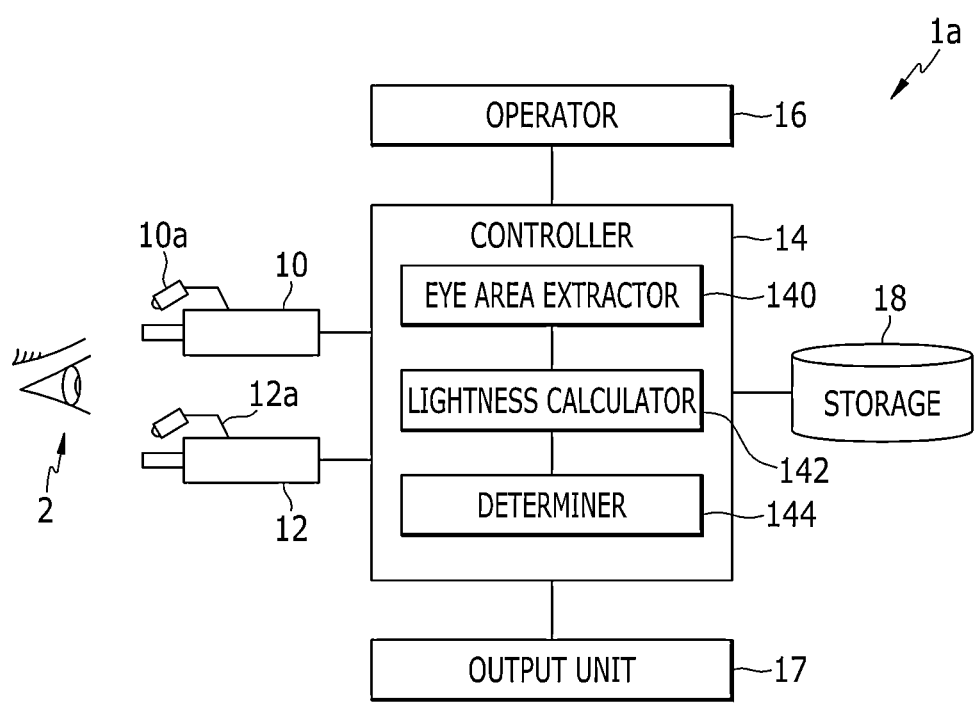
FIG. 1 is a schematic diagram of a fake face identification apparatus according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a face of a fake face means a whole face including an iris, a part of the face including an iris, or a body including the face, etc. Therefore, the fake face may include a fake eye and a fake iris as well as a fake of the whole face.

FIG. 1 is a schematic diagram of a fake face identification apparatus according to an embodiment of the present invention.

Referring to FIG. 1, the fake face identification apparatus 1a includes an infrared-ray eye image acquirer 10, a visible-ray eye image acquirer 12, a controller 14, an operator 16, an output unit 17, and a storage 18.

The fake face identification apparatus 1a is an apparatus for verifying a human face, and can identify a fake face. The fake face identification apparatus 1a may be applicable to various systems such as an access control system, a work hour management system, a building automation system, a banking ATM, a computer security system, an electronic commerce authentication system, or an airport automation system. The fake face identification apparatus 1a uses eye verification. The fake face identification apparatus 1a may use fingerprint verification together with the eye verification.

The infrared-ray eye image acquirer 10 and the visible-ray eye image acquirer 12 acquire an eye image of a subject, and may include a camera. The infrared-ray eye image acquirer 10 acquires the infrared-ray eye image by taking a picture of the subject while radiating an infrared ray. The infrared-ray eye image acquirer 10 has an infrared ray radiator 10a for radiating the infrared ray. As shown in FIG. 1, the infrared ray radiator 10a may be connected to the infrared-ray eye image acquirer 10. In certain embodiments, the infrared ray radiator 10a may be embodied in the infrared-ray eye image acquirer 10. Various radiators may be used as the infrared ray radiator 10a. For example, the infrared ray radiator 10a may be a halogen lamp or a Xenon flash lamp for radiating a short-wavelength infrared ray having wavelengths from 700 nm to 800 nm or a long-wavelength infrared ray having wavelengths from 800 nm to 900 nm. The halogen lamp or Xenon flash lamp may be disposed to the infrared-ray eye image acquirer 10 nearer than the eye of the subject.

The visible-ray eye image acquirer 12 acquires the visible-ray eye image by taking a picture of the subject while radiating a visible ray having a shorter wavelength than the infrared ray. The visible-ray eye image acquirer 12 has a visible ray radiator 12a for radiating the visible ray. As shown in FIG. 1, the visible ray radiator 12a may be connected to the visible-ray eye image acquirer 12. In certain embodiments, the visible ray radiator 12a may be embodied in the visible-ray eye image acquirer 12. Various radiators may be used as the visible ray radiator 12a. For example, a green light emitting diode (LED), a white LED or other light emitting devices for radiating a ray having a visible-ray wavelength may be used as the visible ray radiator 12a. Further, a halogen lamp, an incandescent bulb, or a Xenon flash lamp may be used as the visible ray radiator 12a.

In certain embodiments, if a certain ray and another ray having a shorter wavelength than the certain ray can provide the similar eye characteristic to the infrared ray and the visible ray, the fake face identification apparatus may use the certain ray and the another ray instead of the infrared ray and the visible ray.

The controller 14 controls an operation of the fake face identification apparatus 1a. The controller 14 controls the infrared-ray eye image acquirer 10 and the visible-ray eye image acquirer 12 to simultaneously radiate the infrared ray and the visible ray and to acquire the visible ray eye image and the infrared ray eye image. The controller 14 calculates a lightness of the iris area and a lightness of the sclera area for each of the infrared-ray eye image and the visible-ray eye image. Further, the controller 14 calculates a lightness difference between the iris and the sclera for each of the infrared-ray eye image and the visible-ray eye image, and determines whether the subject is a fake face based on the lightness difference.

In certain embodiments, the controller 14 may calculate the lightness of each area by averaging the lightness in a plurality of pixels of each area. The average of the lightness in the plurality of pixels may be a mean, a median or a mode of the lightness in the plurality of pixels. The plurality of pixels may be all pixels of each area or some pixels of each area.

The iris is an area near to the round colored part of a person's eye, and the sclera is an area near to the white part of the person's eye. The controller may extract an eye area including the iris area and sclera area using the lightness difference of the eye area.

The controller 14 includes an eye area extractor 140, a lightness calculator 142, and a determiner 144.

The eye area extractor 140 extracts the iris area and the sclera area from the infrared-ray eye image and the visible-ray eye image acquired by the infrared-ray eye image acquirer 10 and the visible-ray eye image acquirer 12. The lightness calculator 142 calculates the lightness of the iris area and the lightness of the sclera area for each of the infrared-ray eye image and the visible-ray eye image, and calculates the lightness difference of the iris and the lightness difference of the sclera between the infrared-ray eye image and the visible-ray eye image.

The determiner 144 determines whether the subject uses the fake face based on the lightness differences of the lightness calculator 142. An artificial eye that is made up of silicon represents the specific reflexibility and absorptivity when receiving the infrared ray. Accordingly, the lightness of the iris and the sclera of the artificial eye is different from that of the human eye. Further, the reflexibility of the eye on the photo or the printed page is determined by its material or ink. Accordingly, the lightness of the iris and the sclera of the eye on the photo or the printed page is different from that of the human eye. Therefore, the determiner 144 can determine the fake face using the reflexibility difference between the visible-ray image and the infrared-ray image.

According to an embodiment, the determiner 144 determines that the subject uses the fake face when the lightness difference between the iris and sclera for the infrared-ray eye image is equal to or greater than the lightness difference between the iris and sclera for the visible-ray eye image. The determiner 144 determines that the subject uses a real eye when the lightness difference between the iris and sclera for the infrared-ray eye image is less than the lightness difference between the iris and sclera for the visible-ray eye image. In other words, the determiner 144 determines a case that the iris of the infrared-ray eye image is brighter than the iris of the visible-ray eye image and/or the sclera of the infrared-ray eye image is darker than the sclera of the visible-ray eye image as a real face.

For example, assuming that the lightness of the white is 0 and the lightness of the black is 10, the lightness of the iris is 10 and the lightness of the sclera is 0, for the visible-ray eye image. Therefore, the lightness difference between the iris and the sclera is 10. For the infrared-ray eye image of a real eye, the iris brightens such that its lightness is 1, and the sclera darkens such that its lightness is 9. Therefore, the lightness difference between the iris and the sclera for the infrared-ray eye image of the real eye is 8, and is less than the lightness difference between the iris and the sclera for the infrared-ray eye image, i.e., 10. When the lightness difference between the iris and the sclera is reduced, the determiner 144 determines the real face. However, for the infrared-ray eye image of a fake eye, the lightness of the iris maintains or darkens a little, and the lightness of the sclera maintains or brightens a little. The above-described lightness is an example, and a real lightness may have different value.

In certain embodiments, the lightness calculator 142 may calculate the lightness difference between the iris of the infrared-ray eye image and the iris of the visible-ray eye image, and the lightness difference between the sclera of the infrared-ray eye image and the sclera of the visible-ray eye image. The determiner 144 may determine that the subject uses the real face when the lightness of the iris in the infrared-ray eye image is brighter than the lightness of the iris in the visible-ray eye image and/or the lightness of the sclera in the infrared-ray eye image is darker than the lightness of the sclera in the visible-ray eye image. Further, the determiner 144 may determine that the subject uses the fake face when the lightness of the iris in the infrared-ray eye image is equal to or darker than the lightness of the iris in the visible-ray eye image and/or the lightness of the sclera in the infrared-ray eye image is equal to or brighter than the lightness of the sclera in the visible-ray eye image.

The storage 18 stores the lightness of the iris and the sclera for the infrared-ray eye image and the visible-ray eye image for each user, and the determining result of the determiner 144. The operator 16 receives an operating command from the user, and the output unit 17 displays the determining result of the determiner 144.

Figure 2A:
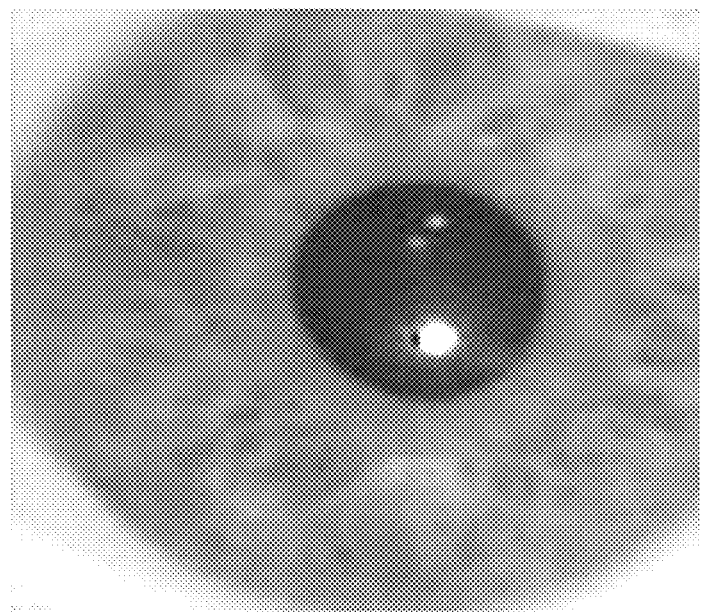
FIG. 2A and FIG. 2B show a difference between a fake eye and a real eye.
Figure 2B:
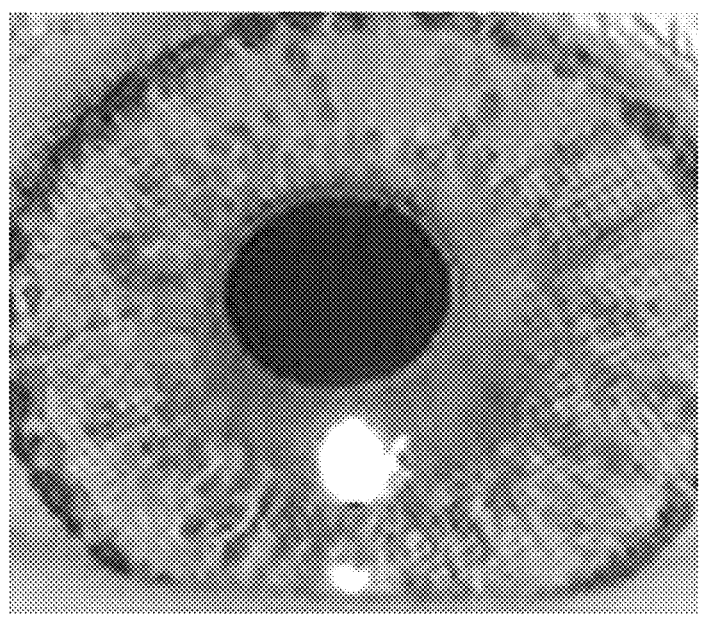

FIG. 2A and FIG. 2B show a difference between a fake eye and a real eye.

An eye of a fake face may be an artificial eye, an eye image on a photo, an eye image on a printed page, an eye of a mannequin, or an eye image played by a video. FIG. 2A is an image of the real eye of the human, and FIG. 2B is an eye image of a human wearing a contact lens on which a fake iris is printed. According to an embodiment of the present invention, a fake face identification apparatus 1a can identify a user that attempts to access a system with malice using the fake face including the fake iris, thereby improving the security.

Figure 3:
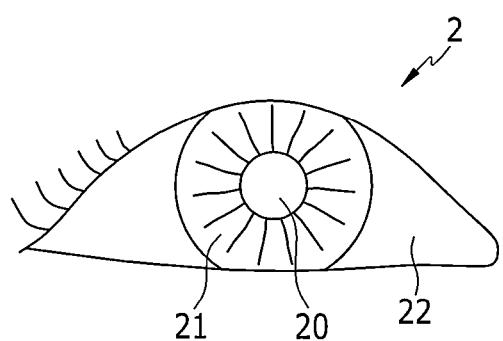
FIG. 3 shows areas which a fake face identification apparatus according to an embodiment of the present invention extracts from an infrared-ray eye image and a visible-ray eye image.

FIG. 3 shows areas which a fake face identification apparatus according to an embodiment of the present invention extracts from an infrared-ray eye image and a visible-ray eye image. Referring to FIG. 3, a sclera area 22 is a white coat that covers the most area of an eyeball, and corresponds to the white of an eye 2. An iris area 21 is a ring-shaped area surrounding the pupil, and controls the amount of light reaching the retina by adjusting the size of the pupil by shrink and relaxation. A pupil area 20 is a hole in the middle of the iris of the eye 2, through which light passes to be focused on the retina.

Figure 4:
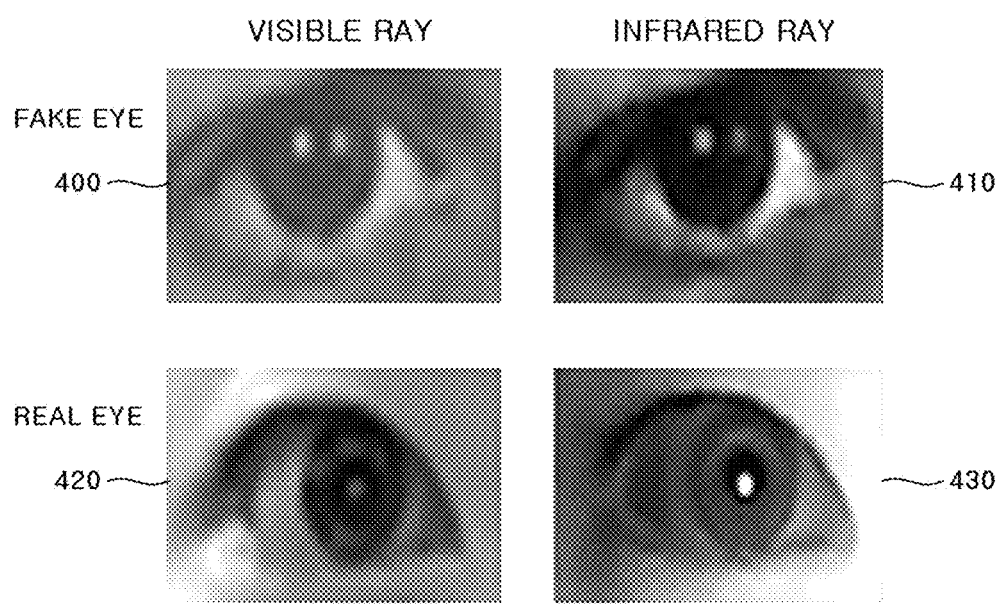
FIG. 4 shows a visible-ray eye image and an infrared-ray eye image for each of a fake eye and a real eye.

FIG. 4 shows a visible-ray eye image and an infrared-ray eye image for each of a fake eye and a real eye.

In the fake eye, a lightness difference between the iris and the sclera for an infrared-ray eye image 410 is equal to or greater than that for the visible-ray eye image 400. However, in the real eye, a lightness difference between the iris and the sclera for the infrared-ray eye image 430 is less than that for the visible-ray eye image 420. In other words, in the real eye, the iris of the infrared-ray eye image 430 is brighter than the iris of the visible-ray eye image 420, and/or the sclera of the infrared-ray eye image 430 is darker than the sclera of the visible-ray eye image 420. According to an embodiment of the present invention, the fake face can be identified by this characteristic.

Figure 5:
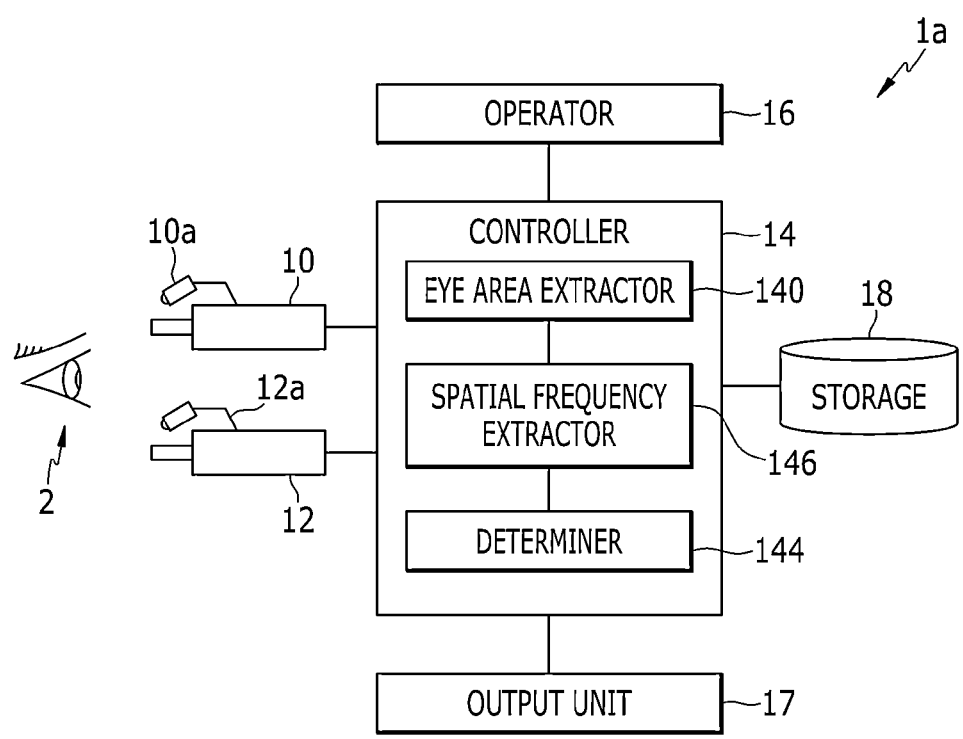
FIG. 5 is a schematic diagram of a fake face identification apparatus according to another embodiment of the present invention.

FIG. 5 is a schematic diagram of a fake face identification apparatus according to another embodiment of the present invention.

Referring to FIG. 5, a fake face identification apparatus 1b according to another embodiment includes a controller 14b including an eye area extractor 140, a spatial frequency extractor 146, and a determiner 148, differently from the fake face identification apparatus 1a shown in FIG. 1.

The eye area extractor 140 extracts an iris area and a sclera area from the infrared-ray eye image and the visible-ray eye image acquired by the infrared-ray eye image acquirer 10 and the visible-ray eye image acquirer 12. The spatial frequency extractor 146 coverts a lightness difference between the iris and sclera to a spatial frequency, for each of the infrared-ray eye image and the visible-ray eye image. The determiner 148 determines whether a subject uses a fake face based on the spatial frequency. The spatial frequency represents lightness variation in an image. As the contrast between the iris and sclera is increased on the same spatial distance, the amplitude of a high frequency component of the spatial frequency is increased.

Because the lightness difference between the iris and the sclera for the infrared-ray eye image is equal to or greater than that for the visible-ray eye image in the fake eye, the amplitude of the high frequency component for the spatial frequency of the infrared-ray eye image is equal or greater than the amplitude of the high frequency component for the spatial frequency of the visible-ray eye image. However, because the lightness difference between the iris and the sclera for the infrared-ray eye image is less than that for the visible-ray eye image in the real eye, the amplitude of the high frequency component for the spatial frequency of the infrared-ray eye image is less than the amplitude of the high frequency component for the spatial frequency of the visible-ray eye image. Accordingly, the determiner 148 may determine that the subject uses the fake face when the amplitude of the high frequency component for the spatial frequency of the infrared-ray eye image is equal or greater than the amplitude of the high frequency component for the spatial frequency of the visible-ray eye image.

Figure 6:
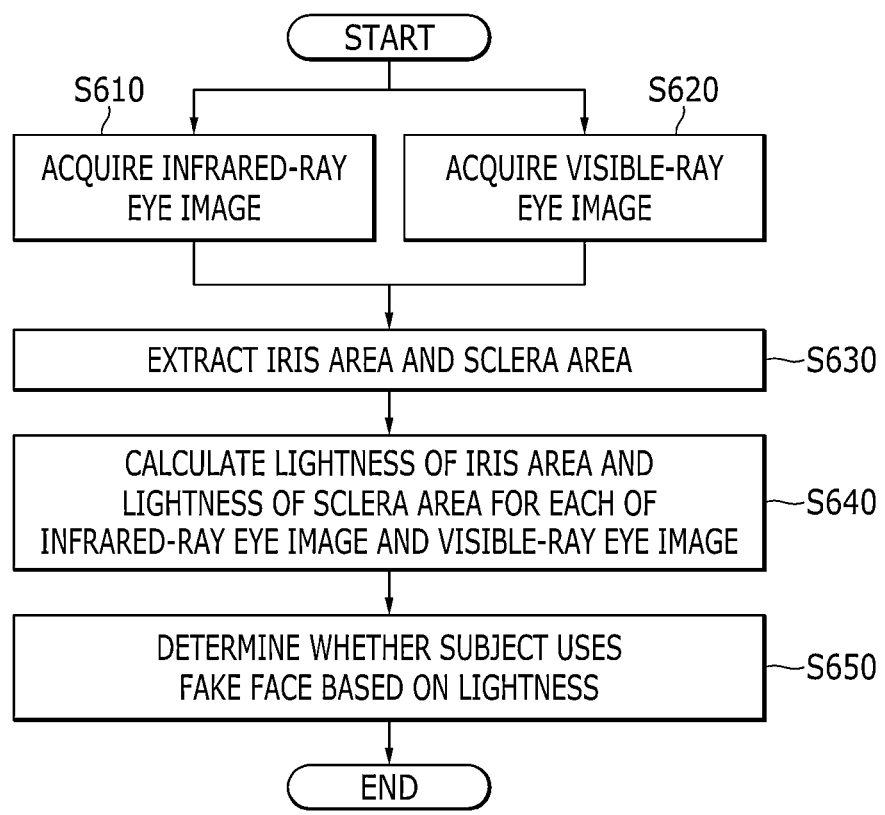
FIG. 6 is a flowchart of a fake face identification method according to an embodiment of the present invention.

FIG. 6 is a flowchart of a fake face identification method according to an embodiment of the present invention.

Referring to FIG. 6, a fake face identification apparatus acquires an infrared-ray eye image by taking a picture of a subject while radiating an infrared ray (S610), and acquires a visible-ray eye image by taking a picture of the subject while radiating a visible ray (S620). The fake face identification apparatus extracts an iris area and a sclera area from the infrared-ray eye image and the visible-ray eye image (S630).

The fake face identification apparatus calculates a lightness of the iris area and a lightness of the sclera area for each of the infrared-ray eye image and the visible-ray eye image (S640). Next, the fake face identification apparatus determines whether the subject uses the fake face based on the calculated lightness (S650).

The fake face identification apparatus may calculate the lightness difference between the iris area and the sclera area for each of the infrared-ray eye image and the visible-ray eye image, and determine whether the subject uses the fake face based on the calculated lightness difference. In certain embodiments, the fake face identification apparatus may calculate the lightness difference between the iris of the infrared-ray eye image and the iris of the visible-ray eye image and the lightness difference between the sclera of the infrared-ray eye image and the sclera of the visible-ray eye image, and determine whether the subject uses the fake face based on the calculated lightness difference. In certain embodiments, the fake face identification apparatus may convert the lightness difference between the iris and sclera to a spatial frequency for each of the infrared-ray eye image and the visible-ray eye image, and determine whether the subject uses the fake face based on the spatial frequency.

As described above, according to embodiments of the present invention, a fake face identification apparatus and method can identify a user that attempts to access a system with malice using the fake face including an artificial eye, an eye image on a photo, an eye image on a printed page, an eye of a mannequin, or an eye image played by a video. Therefore, the fake face identification apparatus and method can determine whether the face is forged, thereby improving the security.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for identifying a fake face, the apparatus comprising:
   a first eye image acquirer configured to acquire a first eye image by taking a picture of a subject while radiating a first ray having a first wavelength;
   a second eye image acquirer configured to acquire a second eye image by taking a picture of the subject while radiating a second ray having a second wavelength that is shorter than the first wavelength; and
   a controller configured to calculate a first lightness of a first area and a second lightness of a second area having brighter lightness than the first area in the first eye image, and a third lightness of the first area and a fourth lightness of the second area having brighter lightness than the first area in the second eye image, and to determine that the subject uses a fake face when amplitude of a high frequency component for a first spatial frequency which is converted from a difference between the first lightness and the second lightness is equal to or greater than amplitude of a high frequency component for a second spatial frequency which is converted from a difference between the third lightness and the fourth lightness, and to determine the subject uses a real face when the amplitude of the high frequency component for the first spatial frequency is less than the amplitude of the high frequency component for the second spatial frequency.

2. The apparatus of claim 1, wherein the first ray includes an infrared ray, and the second ray includes a visible ray.

3. The apparatus of claim 1, wherein the first area includes an iris area, and the second area includes a sclera area.

4. The apparatus of claim 1, wherein the fake face includes any one of an artificial eye, an eye image on a photo, an eye image on a printed page, an eye of a mannequin, or an eye image played by a video.

5. A method of identifying a fake face by a fake face identification apparatus, the method comprising:
   acquiring a first eye image by taking a picture of a subject while radiating a first ray having a first wavelength;
   acquiring a second eye image by taking a picture of the subject while radiating a second ray having a second wavelength that is shorter than the first wavelength;
   extracting a first area and a second area having brighter lightness than the first area from each of the first eye image and the second eye image;
   calculating a first lightness of the first area and a second lightness of the second area in the first eye image, and a third lightness of the first area and a fourth lightness of the second area in the second eye image;
   converting a difference between the first lightness and the second lightness to a first spatial frequency and a difference between the third lightness and the fourth lightness to a second spatial frequency;
   determining the subject uses the fake face when amplitude of a high frequency component for the first spatial frequency is equal to or higher than amplitude of a high frequency component for the second spatial frequency; and
   determining the subject uses a real face when the amplitude of the high frequency component for the first spatial frequency is less than the amplitude of the high frequency component for the second spatial frequency.

6. The method of claim 5, wherein the first ray includes an infrared ray, and the second ray includes a visible ray.

7. The method of claim 5, wherein the first area includes an iris area, and the second area includes a sclera area.

8. The method of claim 5, wherein the fake face includes any one of an artificial eye, an eye image on a photo, an eye image on a printed page, an eye of a mannequin, or an eye image played by a video.

9. The method of claim 5, further comprising storing the first lightness, the second lightness, the third lightness, the fourth lightness, and a determining result of the controller.

* * * * *